US008297881B2

(12) United States Patent
Spani

(10) Patent No.: US 8,297,881 B2
(45) Date of Patent: *Oct. 30, 2012

(54) SALTWATER INTRUSION PREVENTION SYSTEM

(75) Inventor: Wayne W. Spani, Mission Viejo, CA (US)

(73) Assignee: Saltwater Separation, L.L.C., Mission Viejo, CA (US)

( * ) Notice: Subject to any disclaimer, the term of this patent is extended or adjusted under 35 U.S.C. 154(b) by 866 days.

This patent is subject to a terminal disclaimer.

(21) Appl. No.: 10/547,622

(22) PCT Filed: Mar. 11, 2004

(86) PCT No.: PCT/US2004/007319
§ 371 (c)(1),
(2), (4) Date: Sep. 5, 2006

(87) PCT Pub. No.: WO2004/080793
PCT Pub. Date: Sep. 23, 2004

(65) Prior Publication Data
US 2007/0003368 A1 Jan. 4, 2007

Related U.S. Application Data

(63) Continuation of application No. 10/387,246, filed on Mar. 12, 2003, now Pat. No. 6,811,354.

(51) Int. Cl.
*E02B 3/00* (2006.01)
(52) U.S. Cl. .................. 405/80; 210/747.1; 210/170.06; 210/170.11; 137/236.1
(58) Field of Classification Search ...... 405/52, 405/80, 87; 210/747, 170.01, 170.06, 170.09, 210/170.11, 188; 137/236.1
See application file for complete search history.

(56) References Cited

U.S. PATENT DOCUMENTS

| 1,173,367 | A | | 2/1916 | Meacham | |
|---|---|---|---|---|---|
| 1,886,965 | A | | 11/1932 | Meacham | |
| 3,234,123 | A | * | 2/1966 | Hinde | 210/602 |
| 3,293,861 | A | * | 12/1966 | Hinde | 405/61 |
| 3,492,822 | A | * | 2/1970 | Josephs | 405/118 |
| 3,667,234 | A | * | 6/1972 | De Lizasoain | 405/80 |
| 3,713,298 | A | * | 1/1973 | Mendelson | 405/107 |
| 4,062,735 | A | | 12/1977 | Kopp, Jr. | |
| 4,146,346 | A | * | 3/1979 | Salo | 405/80 |
| 4,162,864 | A | | 7/1979 | Maeda et al. | |

(Continued)

OTHER PUBLICATIONS

International Search Report for PCT/US2004/007319, dated Sep. 23, 2004.

*Primary Examiner* — Tara Mayo-Pinnock
(74) *Attorney, Agent, or Firm* — Knobbe Martens Olson & Bear LLP

(57) ABSTRACT

A saltwater intrusion prevention system for use at an interface between a fresh water body and a saltwater body includes a water recovery subsystem for recovering fresh water from a fresh water body. A retention reservoir in fluid communication with the water recovery subsystem receives and redirects the recovered fresh water. A saltwater intrusion barrier subsystem in fluid communication with the retention reservoir is positioned at an interface of the fresh water body and the saltwater body. The saltwater intrusion barrier subsystem includes a plurality of submerged return discharge ports for vertically ejecting the recovered fresh water for providing hydraulic mounding zone, and a fine air bubbler header for creating a mixing zone. The hydraulic mounding zone and the mixing zone increase the density of the fresh water for offsetting saltwater from the saltwater body.

14 Claims, 11 Drawing Sheets

U.S. PATENT DOCUMENTS

| | | | |
|---|---|---|---|
| 4,335,977 A * | 6/1982 | Ihli | 210/170.03 |
| 4,735,224 A | 4/1988 | Pluviose | |
| 4,735,524 A * | 4/1988 | Dunkers | 405/63 |
| 4,884,917 A * | 12/1989 | Christiansen | 405/80 |
| 5,295,762 A | 3/1994 | Lopez | |
| 5,360,290 A | 11/1994 | Yamada | |
| 6,394,698 B1 * | 5/2002 | Christiansen | 405/80 |
| 2001/0006590 A1 | 7/2001 | Bishop | |
| 2002/0119010 A1 | 8/2002 | Len-Rios | |

\* cited by examiner

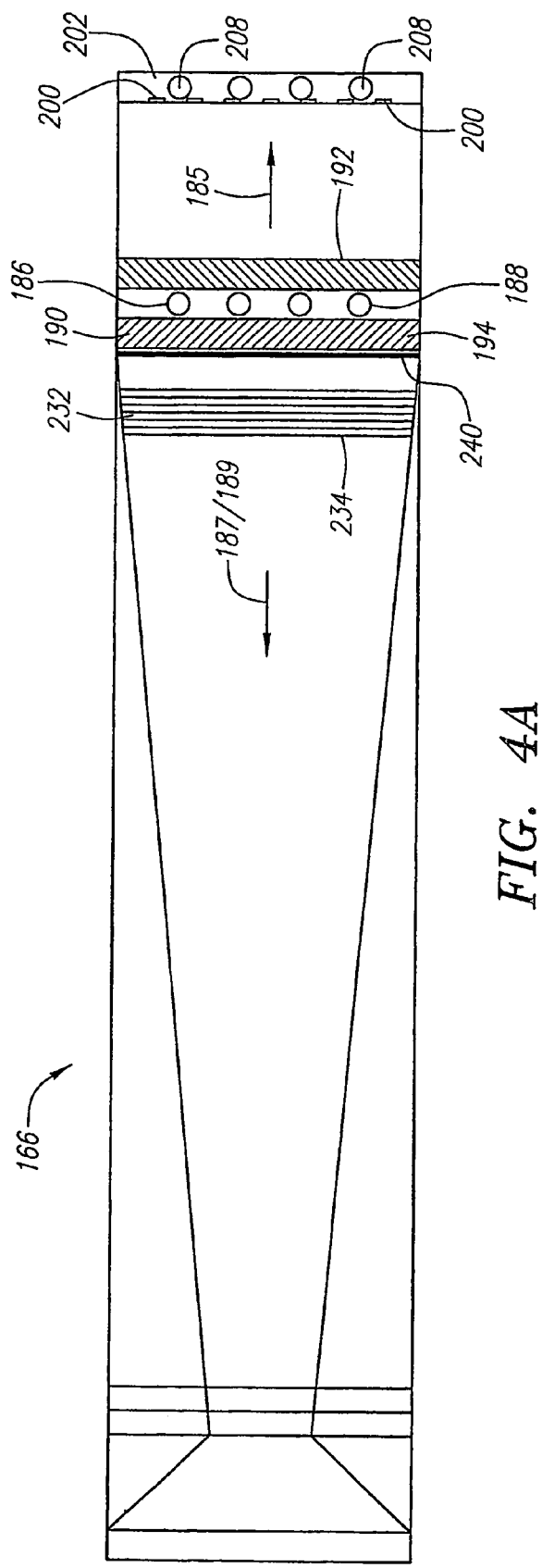
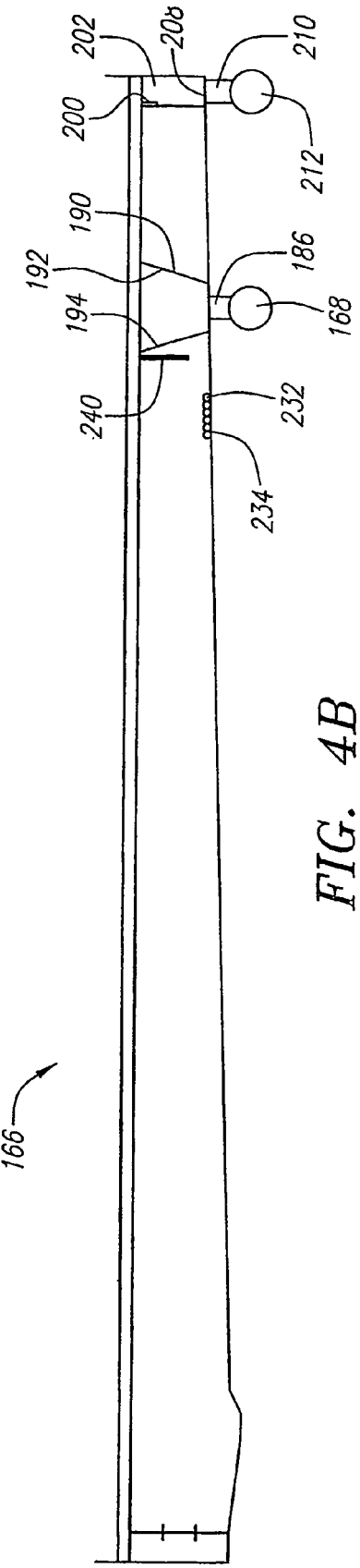
FIG. 4A
FIG. 4B

SALTWATER INTRUSION PREVENTION SYSTEM

This application is the U.S. National Phase under 35 USC §371 of PCT International Application No. PCT/US04/007319, filed Mar. 11, 2004, published in English which is a continuation of U.S. application Ser. No. 10/387,246, filed Mar. 12, 2003, now U.S. Pat. No. 6,811,354.

BACKGROUND OF THE INVENTION

1. Technical Field

The present invention relates to saltwater intrusion into fresh water bodies. More specifically, the present invention relates to methods and apparatus for a saltwater intrusion prevention system typically utilized at the interface of a fresh water body with a saltwater body to prevent the incursion of saltwater into the fresh water body.

2. Background Art

The prior art is directed to methods and apparatus for preventing the incursion of saltwater into freshwater bodies.

The intrusion of ocean saltwater into fresh water bodies through man-made structures such as ship channels, drainage channels, and navigation canals typically involves a process by which seawater migrates up-stream into and through the fresh water body. It is noted that seawater has a higher density than fresh water. In the case of a navigation canal, it is noted that the canal can have one or more canal locks that connect the fresh water body with the saltwater body. Each of the canal locks are flooded with water to enable a water craft to travel between the fresh water body at a first elevation and the saltwater body at a second elevation. The terminal ends of each canal lock include lock chamber doors. The seawater migration process occurs when the lower chamber doors of a canal lock are opened to the ocean. Under these conditions, the denser saltwater current displaces the lighter fresh water as it flows into the lock chamber wherein the saltwater is trapped upon closure of the lock chamber doors. This process repeats itself as successive lock chambers are opened and closed during the operation of the canal lock until the seawater has reached the source of fresh water. As a result of this process, the fresh water body insidiously becomes brackish overtime causing significant changes in the ecosystem and creating a serious threat to the water quality of the fresh water body.

In addition to the intrusion of the saltwater into the fresh water body, other problems exist that contribute to the deterioration of fresh water bodies. In tropical regions, annual precipitation is typically high and thus fresh water bodies regenerate during the rainy periods. This ensures that the water level remains relatively high and also serves to reduce pollution in the fresh water body. Often, the fresh water body functions not only as a navigation canal but also supplies water used for farming, public utilities, drinking, bathing and the like. Because of recent global conditions, rainfall levels have fallen off. Further, it is predicted that rainfall levels over the next fifteen years will be unseasonable low. This condition will, of course, result in less water to replenish fresh water bodies. In additional, operation of the canal locks results in a substantial loss of water each time the lock doors are opened and closed. For example, when the lower lock doors are opened to the saltwater body, literally thousands of gallons of fresh water can escape to the saltwater body. This problem is significant since, in some cases, the number of water craft traversing the canal between the fresh water body and the saltwater body is reduced.

Unfortunately, in certain fresh water bodies, portions are dead or dying with vegetation growth. As a result, bacteria feeds on the vegetation reducing the oxygen level in the fresh water body. Further, waste water and chemicals that are injected into the fresh water body increases the bacteria level and this in combination with reduced flow of fresh water destroys the ecosystem resulting in the death of all marine life in the fresh water body. In tropical climates, fresh water bodies normally rise and fall several times annually. This natural flushing serves to minimize the pollution of the fresh water bodies. When there is a large temperature differential between two bodies of water, clouds will form and rainfall is plentiful. For example, the water temperature of the Atlantic Ocean in the Caribbean area (i.e., approximately 85 degrees Fahrenheit) is typically warmer than the water temperature of the Pacific Ocean in the same area. Consequently, annual precipitation is typically plentiful in this geographical area of the world. However, the forecast of lower precipitation levels in the future is based upon the discovery that the water temperatures of the Atlantic and Pacific Oceans are equalizing. This determination has been made based upon the fact that the water temperature of the Pacific Ocean in the Caribbean region is increasing due to volcanic activity on the floor of the Pacific Ocean. Consequently, the level of pollution in fresh water bodies may not be controlled by the natural flushing process in view of the forecast of lower annual precipitation in many areas of the world.

The preceding problems set forth above create a bleak picture for the survival of fresh water bodies. The intrusion of saltwater from the oceans into fresh water bodies converts the fresh water environment into a brackish (ocean salt) environment destroying the natural flora and marine life. The pollution of fresh water bodies also occurs from the injection of waster water and chemicals and the increased growth of vegetation in the fresh water bodies resulting in increased bacteria levels and reduced oxygen levels therein. Additionally, the forecast of lower precipitation levels resulting from the equalizing of the water temperatures of major saltwater bodies, i.e., for example, the Atlantic Ocean and the Pacific Ocean, reduces the likelihood that pollution levels will be controlled by the process of natural flushing. Finally, fresh water is also lost during each operation of the doors of the canal locks.

Thus, there is a need in the art for a saltwater intrusion prevention system typically utilized at the interface of a fresh water body with a saltwater body to (a) increase the supply of fresh water to the fresh water body by employing a lock water recovery subsystem, (b) divert a portion of the water recovered by the lock water recovery subsystem for providing a saltwater intrusion barrier at the interface of the fresh water body and the saltwater body, (c) improve the quality of the fresh water returned to the fresh water body by filtering, aerating and chemically treating the recovered fresh water, and (d) further filter and chemically treat the recovered fresh water at a potable water treatment facility to provide potable water for drinking, bathing, agricultural and utilitarian use.

DISCLOSURE OF THE INVENTION

Briefly, and in general terms, the present invention provides a new and improved saltwater intrusion prevention system for use at an interface between a fresh water body and a saltwater body to prevent saltwater from entering and causing the fresh water body to become brackish. The saltwater intrusion prevention system can be employed where the fresh water body is a navigation canal or ship channel typically associated with canal locks, or a drainage channel interfacing with a saltwater body where canal locks are not present. The saltwater intrusion prevention system is designed to increase the amount of available fresh water in the fresh water body and to arrest the saltwater intrusion into the fresh water body from the saltwater body.

In a preferred embodiment, a canal lock system typically exists which facilitates the transfer of a water craft, i.e., an ocean going ship, a river craft or the like, from the fresh water body to the saltwater body or visa versa. A key feature of the present invention is the capture of the fresh water typically lost, i.e., discharged, from the fresh water body to the saltwater body during the operation of the canal lock system. When the lower lock doors of the existing canal lock are opened, literally thousands of gallons of fresh water, which previously escaped to the saltwater body, are now captured by a water recovery subsystem. The water recovery subsystem taps into the existing culverts of the canal lock system for capturing previously discharged fresh water and routing the recovered fresh water to a fresh water retention reservoir via a lock water recovery culvert and a gate valve. When the retention reservoir is operating, the gate valve is typically in the normally open position so that the recovered fresh water is fed directly into the retention reservoir.

The retention reservoir serves several functions including: (a) delivering a first volume of the recovered fresh water to a saltwater intrusion barrier subsystem located at an interface between the fresh water body and the saltwater body for preventing the intrusion of saltwater into the fresh water body, (b) returning a second volume of the recovered fresh water to the fresh water body to increase the fresh water level thereof; and (c) delivering a third volume of the recovered fresh water to a potable water treatment facility for further processing to provide fresh water to, for example, a local water utility company for drinking, cooking, bathing, agriculture and the like.

The retention reservoir includes a debris screen for filtering out large debris within the recovered fresh water. Once filtered through the debris screen, the first volume of the recovered fresh water is diverted to the saltwater intrusion barrier subsystem via a plurality of weir gate valves, an overflow sump, and a retention reservoir discharge culvert. The retention reservoir discharge culvert terminates in a plurality of submerged return discharge ports positioned to vertically eject the first volume of the recovered fresh water for providing a hydraulic mounding zone. Additionally, a fine air bubbler header comprised of a submerged, perforated, coated pipe is provided for creating a pneumatic mixing zone. The combination of the hydraulic mounding zone and the pneumatic mixing zone serves to increase the density of the fresh water within the interface of the fresh water body and the saltwater body for offsetting saltwater intrusion into the fresh water body.

The remaining recovered fresh water, once filtered through the debris screen, is subjected to a chemical pre-treatment within the retention reservoir to satisfy a first stage treatment standard. This remaining recovered fresh water is also subjected to a course air bubbler header for oxygenating the fresh water. Chemical flocculent is then added to this remaining recovered fresh water for settling suspended solids. The course air bubbler header also serves to mix the chemical flocculent to attach onto the suspended solvents and materials such as oils and grease. A flow baffle is employed for forcing solids to a bottom of the retention reservoir for collection. Thereafter, the second volume of the recovered fresh water is pumped back to the fresh water body to increase the volume of fresh water therein. Finally, the third volume of the recovered fresh water is pumped to the potable water treatment facility for further processing to provide fresh water.

The present invention is generally directed to a saltwater intrusion prevention system typically used at an interface between a fresh water body and a saltwater body to prevent saltwater from entering and causing the fresh water body to become brackish. The saltwater intrusion prevention system can be employed where the fresh water body is a navigation canal or ship channel associated with canal locks, or a drainage channel interfacing with a saltwater body where canal locks are not present. In its most fundamental embodiment, the saltwater intrusion prevention system used at an interface between a fresh water body and a saltwater body includes a water recovery subsystem for recovering fresh water from a fresh water body. A retention reservoir in fluid communication with the water recovery subsystem receives and redirects the recovered fresh water. A saltwater intrusion barrier subsystem in fluid communication with the retention reservoir is positioned at an interface of the fresh water body and the saltwater body. The saltwater intrusion barrier subsystem includes a plurality of submerged return discharge ports for vertically ejecting the recovered fresh water for providing a hydraulic mounding zone, and a fine air bubbler header for creating a mixing zone. The hydraulic mounding zone and the mixing zone increase the density of the fresh water for offsetting saltwater from the saltwater body.

These and other objects and advantages of the present invention will become apparent from the following more detailed description, taken in conjunction with the accompanying drawings which illustrate the invention, by way of example.

BRIEF DESCRIPTION OF THE DRAWINGS

FIG. 4A is a top plan view of the fresh water retention reservoir showing the concrete reservoir including a plurality of weir gate valves and discharge piping directed to the saltwater intrusion barrier subsystem, input piping from the lock water recovery culvert up-feeding to a debris screen, and flow baffle.

FIG. 4B is a side elevation of the fresh water retention reservoir showing the concrete reservoir including the lock water recovery culvert feeding the input piping to the debris screen, and the weir gate valves and discharge piping directed to a retention reservoir discharge culvert.

DETAILED DESCRIPTION OF THE INVENTION

Figure 1:
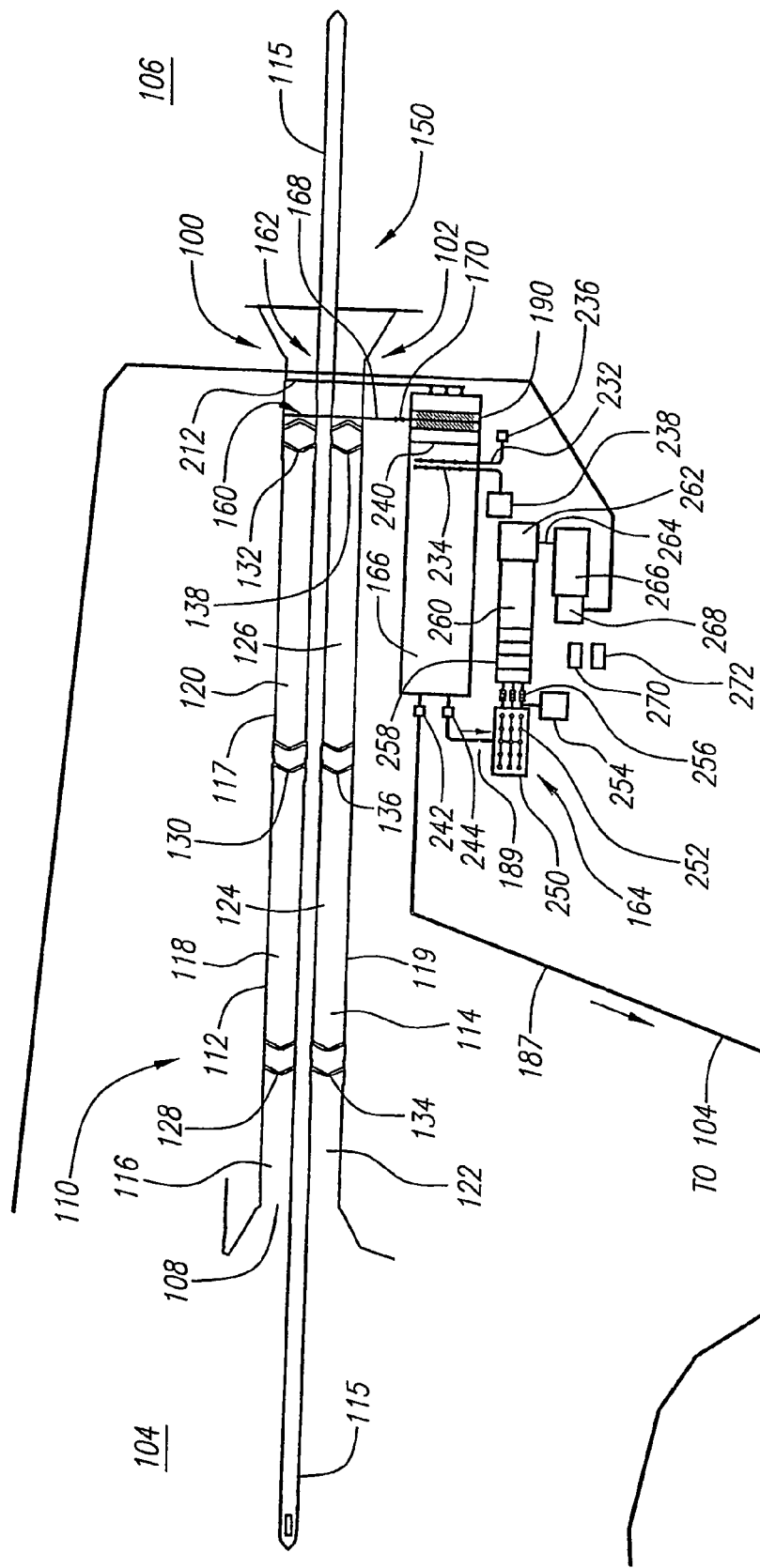
FIG. 1 is an aerial plan view of a saltwater intrusion prevention system of the present invention showing a fresh water retention reservoir, a saltwater intrusion barrier subsystem, and a potable water treatment facility, each utilized in conjunction with a navigational lock system located at the interface of a fresh water body with a salt water body.

The present invention is a saltwater intrusion prevention system 100 typically employed at an interface region 102 between a fresh water body 104 and a saltwater body 106 as shown in FIG. 1 to prevent saltwater from entering and causing the fresh water body 104 to become brackish. The saltwater intrusion prevention system 100 can be employed where the fresh water body 104 is a navigation canal or ship channel typically associated with canal locks, or a drainage channel interfacing with a saltwater body where canal locks are not present. The saltwater intrusion prevention system 100 is designed for: (a) increasing the amount of available fresh water in the fresh water body 104; (b) ensuring that the fresh water added to the fresh water body 104 meets minimum fresh water standards; (c) supporting the municipal requirements for fresh water usage including water craft transit, industrial and agriculture usage, and public use consumption; (d) protecting the fresh water environment and the marine habitat; and (e) arresting the saltwater intrusion into the fresh water body 104 from the saltwater body 106.

Figure 2:
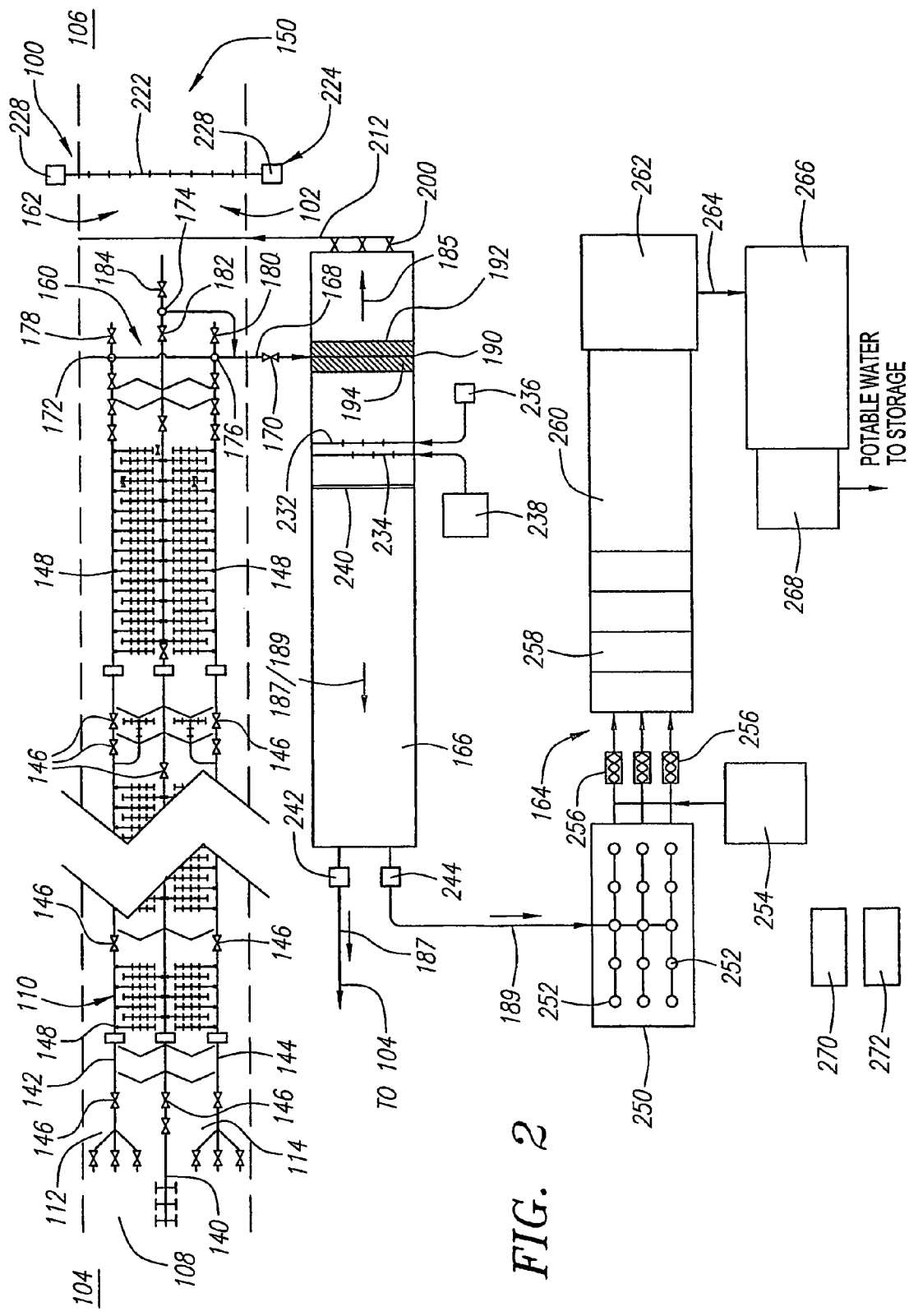
FIG. 2 is a system block diagram of the saltwater intrusion prevention system of FIG. 1 showing more detail of the fresh water retention reservoir, saltwater intrusion barrier subsystem, and potable water treatment facility, each in relation to the navigational lock system located at the interface of a fresh water body with a salt water body.

In a preferred embodiment of the present invention, a navigation canal 108 having an existing canal lock system 110 is assumed to exist as is shown in FIGS. 1 and 2. Notwithstanding this assumption, the present invention is applicable to other fresh water bodies that interface with a saltwater body where the fresh water body does not include a canal lock system. The aerial plan view of the present invention shown in FIG. 1 illustrates the navigation canal 108 while the system block diagram shown in FIG. 2 illustrates the existing canal lock system 110. The navigation canal 108 and the existing canal lock system 110 each facilitate the transfer of water craft from the fresh water body to the saltwater body and visa versa. Depending upon the size of the navigation canal 108, the water craft can range from small vessels to large ocean going ships.

A general overview of an existing canal lock system 110 will now be presented with reference to FIG. 2. The canal lock system 110 shown in FIG. 2 is intended to represent a generalized canal lock system that exists in the prior art. The canal lock system 110 can include, for example, parallel locks 112 and 114 each of which is capable of facilitating the passage of a water craft such as a ship as shown in FIGS. 1 and 2. The parallel locks 112 and 114 are separated by a center wall 115 and bounded by a pair of sidewalls 117 and 119, and are typically divided into a plurality of stages 116, 118 and 120, and 122, 124 and 126, respectively. Note that the fresh water level at each of the stages 116, 118 and 120, and 122, 124 and 126 is different from the fresh water level of the previous stage and of the next stage. Thus, each stage 116, 118 and 120, and 122, 124 and 126 is at a different water level above sea level than the other stages. As a result, a water craft can, for example, step-up or step-down through the different stages 116, 118 and 120, and 122, 124 and 126, respectively, over the entire length of the parallel locks 112 and 114 as shown in FIG. 1. This design enables a water craft to travel from, for example, a saltwater body 106 at sea level to a fresh water body 104 such as a lake or a river that is not at sea level.

Each of the lock stages 116, 118 and 120, and 122, 124 and 126 is separated from the previous stage and the next stage by one of a plurality of lock doors 128, 130 and 132, and 134, 136 and 138, respectively, as shown in FIG. 1. Thus, each stage 116, 118 and 120, and 122, 124 and 126 of the parallel locks 112 and 114 is isolated from the other stages and thus each stage can be flooded separately with fresh water to raise or lower the water craft along the length of each parallel lock 112 and 114. Typically, each lock door 128, 130 and 132, and 134, 136 and 138 is operated by a gearing system driven by a hydraulic ram (not shown) which enables the lock doors 128, 130 and 132, and 134, 136 and 138 to open and close. The lock doors are swing doors which typically open inward, i.e., toward the parallel locks 112, 114, to allow more fresh water flow toward the saltwater body 106 which reduces the saltwater intrusion. The lock door 132 of the lock stage 120 of parallel lock 112, and the lock door 138 and lock stage 126 of parallel lock 114 are both final stage locks. The lock doors 132 and 138 (referred to as lower lock doors) are enabled to open and close because the fresh water in the final stage locks 120 and 126 is always one foot higher than sea level to create a one foot differential head.

A piping and valve arrangement suitable for use in the parallel locks 112 and 114 will now be briefly discussed with reference to FIG. 2. The parallel lock 112 and the parallel lock 114 can be designed to share the piping and valves that function to carry fresh water from the fresh water body 104 to the lock stages 116, 118 and 120, and 122, 124 and 126 for operating the canal lock system 110. In order to accomplish this goal, the parallel locks 112 and 114 comprise three main culverts for transporting fresh water from the fresh water body 104 to the canal lock system 110. The piping system comprises a center culvert 140 and a pair of side culverts 142 and 144 associated with lock 112 and lock 114, respectively, as shown in FIG. 2. It is noted that the diameters of the culverts 140, 142 and 144 can vary according to the size of the canal lock system 110 and can be as large as eighteen feet (18'0"). In the design example, each of the parallel locks 112 and 114 utilizes the center culvert 140 and one of the side culverts 142, 144. Thus, the parallel lock 112 utilizes the center culvert 140 and the side culvert 142 to transport fresh water from the fresh water body 104 to the parallel lock 112. Likewise, the parallel lock 114 utilizes the center culvert 140 and the side culvert 144 to transport fresh water from the fresh water body 104 to the lock 114. The transporting of the fresh water through the center culvert 140 and the side culverts 142 and 144 can be accomplished by pumping systems or via a gravity flow design.

Each of the side culverts 142 and 144 and the center culvert 140 includes a plurality of valves and piping employed to flood each stage 116, 118 and 120, and 122, 124 and 126 of the parallel locks 112 and 114, respectively, for the purpose of moving the water craft through the canal lock system 110. The center culvert 140 and the two side culverts 142 and 144 function to flood each of the lock stages 116, 118 and 120, and 122, 124 and 126 of the parallel locks 112, 114, respectively. The means to enable the fresh water from the fresh water body 104 to reach each lock stage 116, 118 and 120, and 122, 124 and 126 is through a plurality of motor operated miter valves 146 as shown in FIG. 2. The size of each of the miter valves 146 is dependent upon the size of the center culvert 140 and each of the side culverts 142 and 144. A large canal lock system 110 would require a high capacity center culvert 140 and side culverts 142 and 144 which in turn would require large miter valves 146. Miter valves 146 have been known to have diameters as large as eighteen feet (18'0"). Once the fresh water passes a particular motor operated miter valve 146, the fresh water can flow into a selected one of the lock stages 116, 118 or 120, or 122, 124 or 126 via one of a plurality lateral port plug valves 148. The lock system 110 can be designed so that the fresh water is pumped into the separate lock stages, or in the alternative, be designed so that the fresh water gravity flows into the separate lock stages.

In the prior art, the fresh water contained within the final stage locks 120 and 126 shown in FIG. 1 was allowed to escape via gravity flow to the saltwater body 106 when the lock doors 132 and 138, respectively, were opened. Because the fresh water was permitted to flow out of the final stage locks 120 and 126, thousands of gallons of fresh water were lost to the saltwater body 106 each time a water craft transited through the canal lock system 110. Because of weather changes which have affected the annual precipitation worldwide, the fresh water loss due to operation of the lock system 110 can no longer be tolerated. In the operation of the canal lock system 110, a water craft passing through, for example, the parallel lock 114 from the fresh water body 104 to the saltwater body 106 is as follows. As an example, when the water craft is in lock stage 124, the water level might be 60'0" above sea level. The water craft then transits from lock stage 124 to lock stage 126 as shown in FIG. 1 where the water level in lock stage 126 might be 30'0" above sea level. While the water craft is located in lock stage 126, the fresh water level might be dropped from 30'0" above sea level to 1'0" above sea level, i.e., a 29'0" drop. Since the fresh water level in lock stage 126 is only 1'0" above sea level, the final stage lock doors 138 can be opened permitting the water craft to transit through the interface region 102 and into a saltwater channel 150 to the saltwater body 106. Afterwards, the final stage lock doors 138 are closed. The fresh water located in the final lock stage 126 does not escape to the saltwater body 106 because the fresh water level in the final lock stage 126 is 1'0" higher than the water level of the saltwater body 106. Thus, the pressure between the fresh water in the final lock stage 126 and the saltwater in the saltwater body 106 is equalized.

Figure 10:
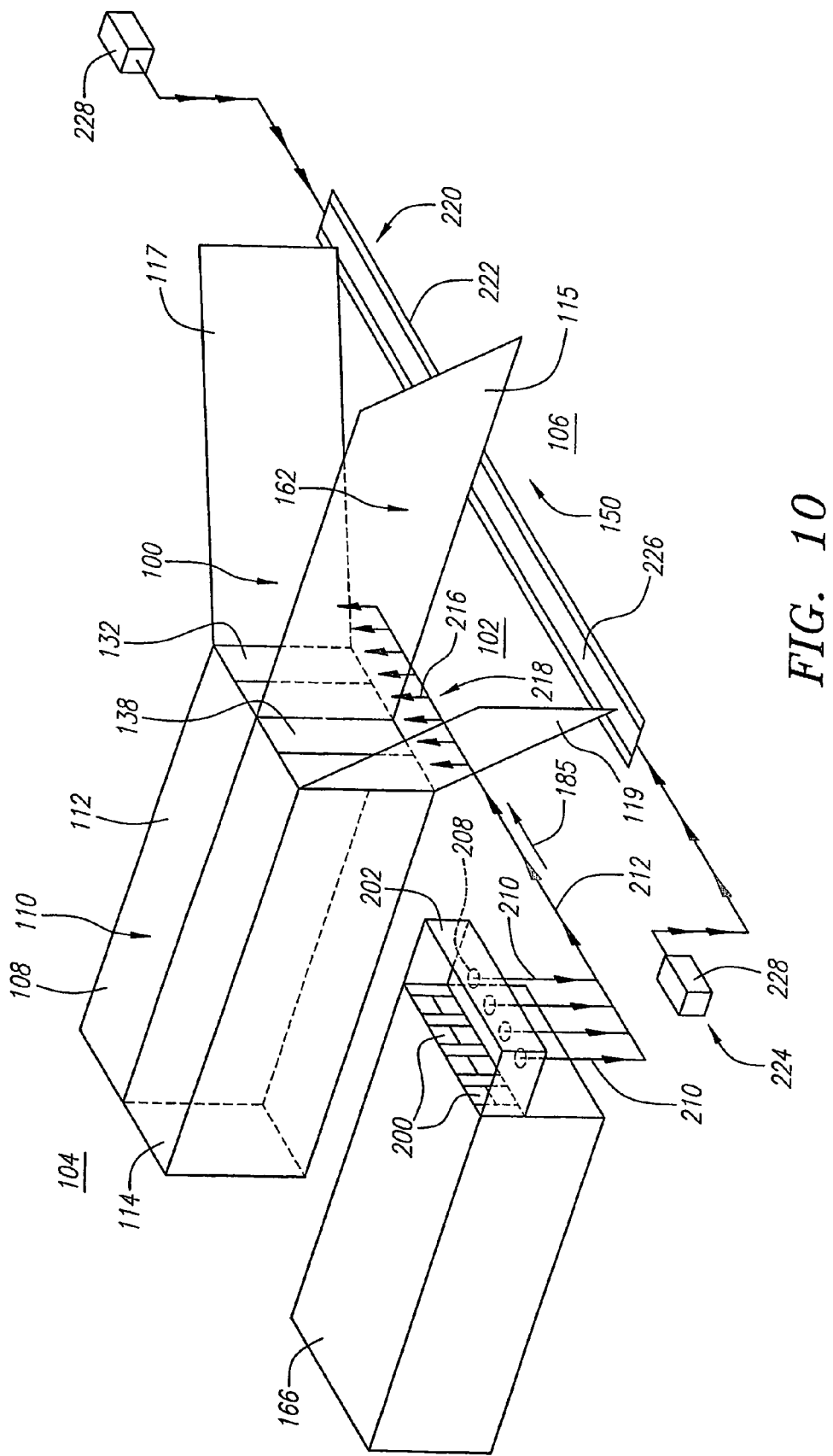
FIG. 10 is an isometric view of the fresh water retention reservoir and the saltwater intrusion barrier subsystem showing the retention reservoir discharge culvert employed to provide a hydraulic mounding zone and the fine air bubbler header utilized for providing a pneumatic mixing zone within the interface of the fresh water body and the saltwater body.

In the past, there was no attempt at fresh water conservation. Thus, the drop in the fresh water level in the final lock stage 126 from 30'0" above sea level to 1'0" above sea level in the example set forth in the immediately preceding paragraph occurred as follows. The appropriate motor operated miter valves 146 located within the center culvert 140 and the side culverts 142 and 144 of the parallel lock 114 (in this example) were opened as they would be during normal operations. Thus, the fresh water associated with the 29'0" drop in the freshwater level in the final lock stage 126 was drained from the center culvert 140 and the side culverts 142 and 144. In the procedure practiced in the past, the 29'0∆ of fresh water was discharged to the interface region 102 (shown best in FIGS. 8 and 10). The interface region 102 is located just outside the lock doors 132 and 138 of lock stages 120 and 126, respectively, between the fresh water body 104 and the saltwater body 106 shown best in FIG. 8. Thus, the discharged fresh water would eventually reach the saltwater channel 150 of the saltwater body 106.

Figure 3:
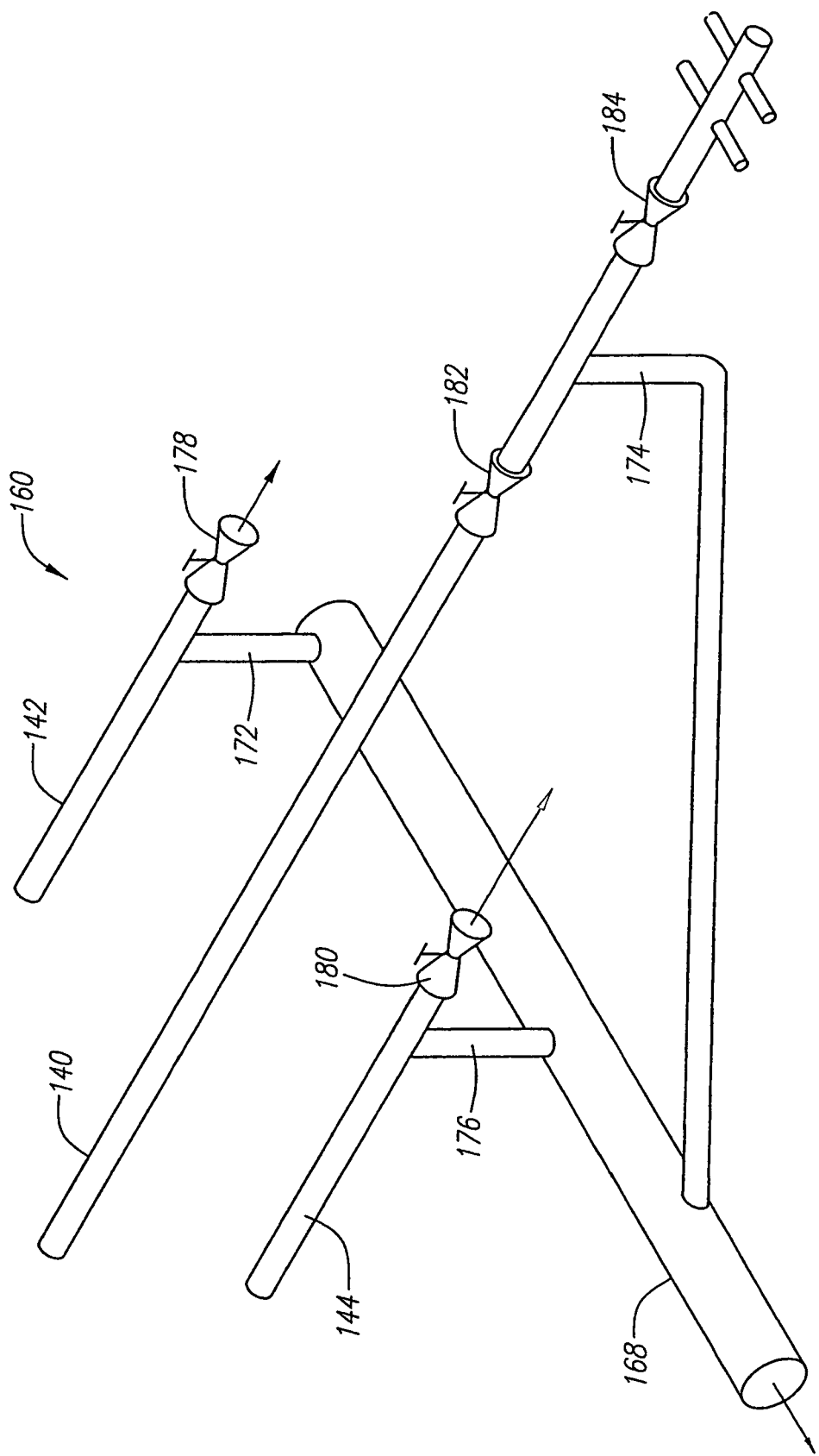
FIG. 3 is a perspective view of a lock water recovery subsystem showing a retention reservoir lock water recovery culvert receiving lock water from existing side culverts and an existing center culvert of the navigational lock system.

An important feature of the present invention is a lock water recovery subsystem 160 shown best in FIG. 3 but also shown in FIGS. 1 and 2. The lock water recovery subsystem 160 performs the important function of capturing the fresh water previously discharged from the final lock stages 120 and 126 to the interface region 102 leading to the saltwater body 106 during normal operations of the canal lock system 110. The fresh water captured by the lock water recovery subsystem 160 is then processed to be (a) utilized in a saltwater intrusion barrier subsystem 162, (b) purified by a potable water treatment facility 164, and (c) returned to the fresh water body 104 for replenishing the fresh water supply. The lock water recovery subsystem 160 is clearly shown in FIG. 3 and functions to collect all of the fresh water that was previously discharged from the final lock stages 120 and 126 to the interface region 102 in the past. Continuing the example from the preceding two paragraphs relating to the drop in fresh water level from 30'0" above sea level to 1'0" above sea level, the appropriate motor operated miter valves 146 located in the center culvert 140 and the side culverts 142 and 144 are opened. The fresh water associated with the 29'0" drop in the fresh water level in the final lock stage 126 is then drained from the center culvert 140 and the side culverts 142 and 144 into the lock water recovery subsystem 160.

Figure 5:
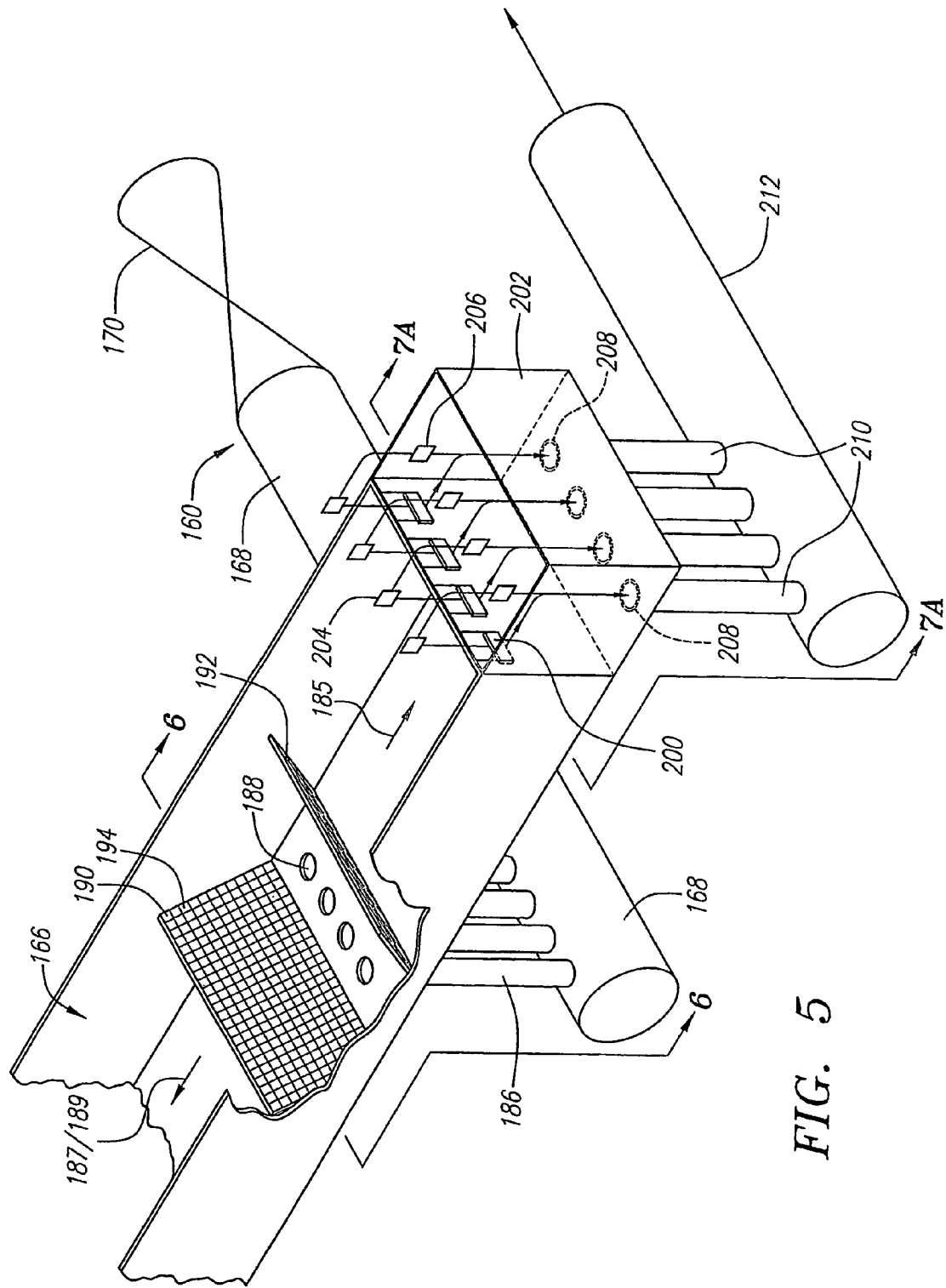
FIG. 5 is a perspective view of the lock water recovery culvert and the retention reservoir discharge culvert showing the input piping extending between the recovery culvert and the retention reservoir, and the discharge piping extending between the discharge culvert and an overflow sump.

The construction of the lock water recovery subsystem 160 is as follows. The lock water recovery subsystem 160 is designed to tap into the existing culverts of the canal lock system 110, i.e., center culvert 140 and side culverts 142 and 144, for capturing the canal fresh water previously discharged to the interface region 102 in the prior art, i.e., prior to the present invention. The recovered fresh water from the canal lock system 110 is then routed to a fresh water retention reservoir 166 via a lock water recovery culvert 168 and a gate valve 170 as is shown in FIGS. 3 and 5. When the retention reservoir 166 shown in FIGS. 1, 2 and 5 is operational, the gate valve 170 is typically in the normally open position. Thus, the recovered fresh water can then be fed directly into the retention reservoir 166 via the lock water recovery culvert 168 as shown best in FIG. 5. The lock water recovery culvert 168 is an underground culvert which can be as large as 36'0" in diameter and connects the existing culverts of the canal lock system 110, i.e., center culvert 140 and side culverts 142 and 144, to the fresh water retention reservoir 166 which is clearly shown in FIGS. 1 and 2. The lock water recovery culvert 168 can be comprised of any suitable material such as, for example, stainless steel.

Figure 6:
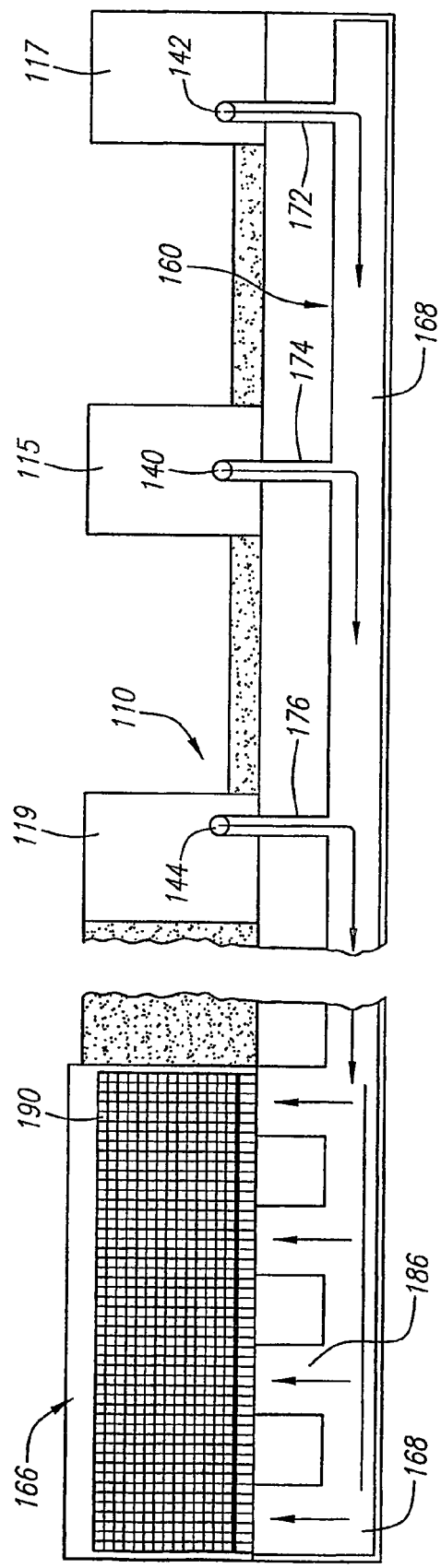
FIG. 6 is a cross-sectional view of the retention reservoir and the lock water recovery culvert taken along the line 6-6 of FIG. 5, and also illustrating a lock system discharge culvert showing the sidewall culverts and the center wall culvert shown in FIG. 3.
Figure 7:
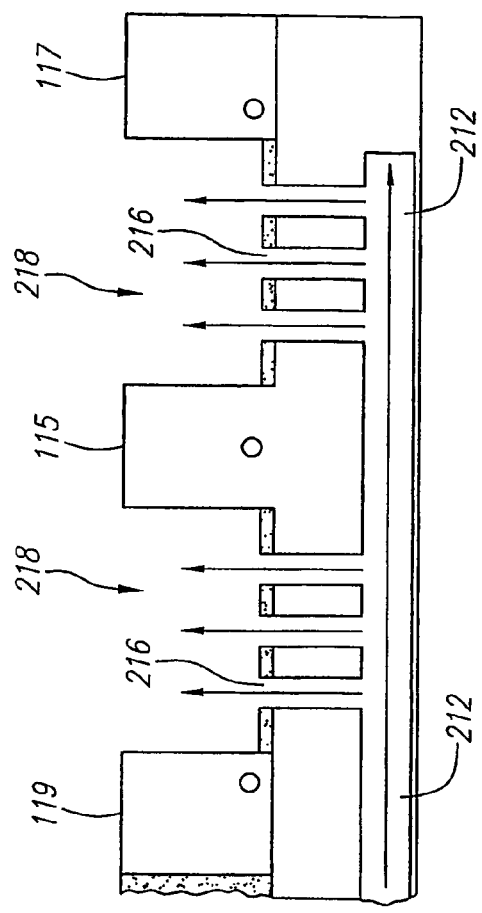
FIG. 7 is a cross-sectional view of the discharge side of the retention reservoir and the retention reservoir discharge culvert taken along line 7A-7A of FIG. 5 showing the weir gate valves, and along line 7B-7B of FIG. 8 showing the vertical ejection of lock water for providing a hydraulic mounding zone.
Figure 7:
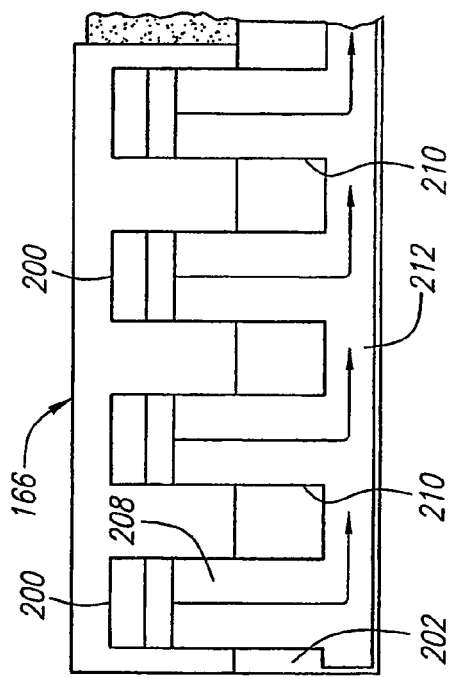

In the preferred embodiment, the lock water recovery culvert 168 is connected to the canal lock system 110 by the use of a plurality of tie-in culverts 172, 174 and 176 as shown in FIGS. 3 and 6. In particular, (a) side culvert 142 is connected to the lock water recovery culvert 168 via tie-in culvert 172, (b) center culvert 140 is connected to the lock water recovery culvert 168 via tie-in culvert 174, and (c) side culvert 144 is connected to the lock water recovery culvert 168 via tie-in culvert 176. Each of the tie-in culverts 172, 174 and 176 can be as large as 18'0" in diameter. Further, the side culvert 142 and side culvert 144 each include a normally closed gate valve 178 and 180, respectively, to prevent fresh water flow beyond the gate valves 178 and 180. This construction, in effect, forces the fresh water to flow into the tie-in culverts 172 and 176, respectively, and then into the lock water recovery culvert 168. Likewise, the center culvert 140 includes a normally open gate valve 182 and a normally closed gated valve 184. The normally open gate valve 182 enables the fresh water from the canal lock system 110 to pass but the normally closed gate valve 184 blocks the flow. Consequently, the fresh water is effectively forced to flow into the tie-in culvert 174 and then to the lock water recovery culvert 168. In the event that the lock water recovery subsystem 160 is not in operation and the normally open gate valve 170 placed in the lock water recovery culvert 168 is closed, gate valves 178, 180, 182 and 184 (or any combination thereof) can be placed in the open position so that the fresh water can be discharged to the interface region 102 as in the past.

The retention reservoir 166, which is constructed in close proximity to the lower lock doors 132 and 138 of the parallel locks 112 and 114, respectively, receives all of the fresh water recovered by the lock water recovery subsystem 160 from the canal lock system 110. The fresh water is received in the retention reservoir 166 via the lock water recovery culvert 168 and the normally open gate valve 170 as is clearly shown in FIG. 5. After the recovered fresh water is received in the retention reservoir 166, it is generally routed in at least three directions. In general, a first volume of the recovered fresh water (indicated by arrow 185) is directed to the saltwater intrusion barrier subsystem 162 located at the interface region 102 between the fresh water body 104 and the saltwater body 106. The first volume of the recovered fresh water (indicated by arrow 185) is utilized for preventing the intrusion of saltwater into the fresh water body 104. A second volume of the recovered fresh water (indicated by arrow 187) is returned to the fresh water body 104 to increase the level of fresh water available for operation of the canal lock system 110. Finally, a third volume of the recovered fresh water (indicated by arrow 189) is delivered to the potable water treatment facility 164 for further processing for providing adequate fresh water to, for example, a local water utility company for use in drinking, cooking, bathing, agriculture and other suitable uses.

The retention reservoir 166 is positioned above the underground lock water recovery culvert 168 as is clearly shown in FIG. 5. The lock water recovery culvert 168 dead-ends underneath the retention reservoir 166. A plurality of riser culverts 186 connect the lock water recovery culvert 168 to the retention reservoir 166 forming a plurality of flow portals 188. The riser culverts 186 in combination with the flow portals 188 provide a path for the recovered fresh water to flow into the retention reservoir 166. The retention reservoir 166 typically is a large concrete pool reminiscent of a large swimming pool which can have, for example, a length of 1200', a width of 250', and a height that matches the height of the canal lock system 110. One of the main functions of the retention reservoir 166 is to filter and pre-treat the recovered fresh water to a first stage treatment standard. Upon entering the retention reservoir 166, the recovered fresh water encounters a debris screen 190 as shown in FIGS. 1, 2, 4A, 4B, 5 and 6. The debris screen 190 assists in facilitating the filtering of the recovered fresh water by removing all large debris such as, for example, tree trunks, floating vegetation, and in some cases marine life.

The debris screen 190 is a feature well known in the art and is typically used in situations which involve raw water containing large matter and debris. An example includes the use of a debris screen associated with a cooling tower of a power plant which draws cooling water for the power plant from local lakes, rivers and other large bodies of water. The debris screen 190 which becomes clogged with debris can include a self-wiping feature (not shown) which is well known in the art. The function of the self-wiper (not shown) is to sweep debris from the debris screen 190 into, for example, a basket or container which when filled with debris is programmed to be lifted and dumped outside of the retention reservoir 166. The self wiper feature (not shown) of the debris screen 190 can be a reverse flow self wiper or a self-wiping screen blade powered by an electrical motor. This type of self-wiping mechanism (not shown) is typically available from a manufacturer that provides water treatment products for power plants.

In the preferred embodiment, the debris screen 190 is V-shaped and includes a first screen component 192 and a second screen component 194 as is clearly shown in FIG. 5. When the recovered fresh water enters the riser culverts 186 and exits the plurality of flow portals 188 within the debris screen 190, the first volume of the recovered fresh water (indicated by arrow 185) passes through the first screen component 192 of the debris screen 190 as is shown in FIG. 5. The remainder of the recovered fresh water (which includes the second volume of the recovered fresh water indicated by the arrow 187, and the third volume of the recovered fresh water indicated by the arrow 189) passes through the second screen component 194 of the debris screen 190. We will now turn to the saltwater intrusion barrier subsystem 162 to which the first volume of recovered fresh water (indicated by arrow 185) is directed.

The first volume of recovered fresh water (indicated by arrow 185) after passing through the first screen component 192 is next directed to a plurality of Weir gate valves 200 as is shown best in FIGS. 2 and 5. The plurality of Weir gate valves 200 function to pass the first volume of recovered fresh water (indicated by arrow 185) from the retention reservoir 166 to an overflow sump 202. The overflow sump 202 serves to contain the first volume of recovered fresh water (indicated by arrow 185) that is diverted to the saltwater intrusion barrier subsystem 162. The Weir gate valves 200 operate in conjunction with a Weir gate controller 204 and a level controller 206 to control the level of the first volume of recovered fresh water (indicated by arrow 185) in the overflow sump 202. It is noted that a Weir gate valve 200 operates in a manner similar to a float valve, i.e., the height of the fresh water level determines if the valve is open or closed wherein increasing height of water level causes the valve to close. Thus, the position of the Weir gate valves 200 is controlled by the tides of the saltwater body 106 which are typically ocean tides. The controlled level of the first volume of recovered fresh water (indicated by arrow 185) in the overflow sump 202 is maintained at +3" above sea level. This design thus enables the Weir gate valves 200 to prevent a back-flow condition of saltwater from saltwater body 106 from entering the retention reservoir 166. Thus, the operation of the plurality of Weir gate valves 200 in combination with the Weir gate controller 204 and the level controller 206 prevent the recovered fresh water present within the retention reservoir 166 from becoming brackish. The retention reservoir 166 acts as a separation barrier between the first volume of recovered fresh water (indicated by arrow 185) and the saltwater body 106.

Figure 8:
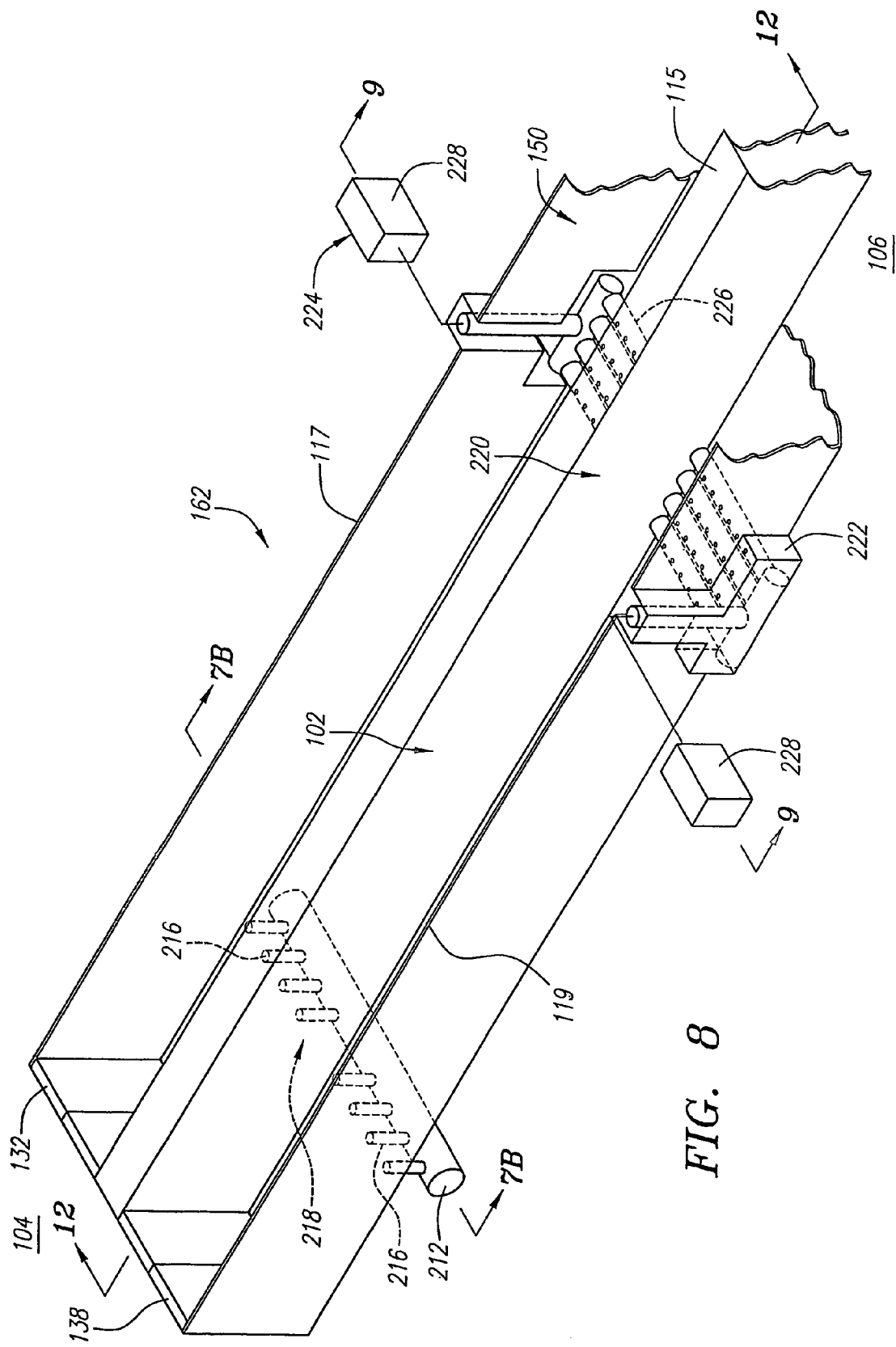
FIG. 8 is a perspective view of the saltwater intrusion barrier subsystem showing the retention reservoir discharge culvert including a plurality of submerged return discharge ports, and a fine air bubbler header in combination with a pair of air compressor stations, respectively.
Figure 9:
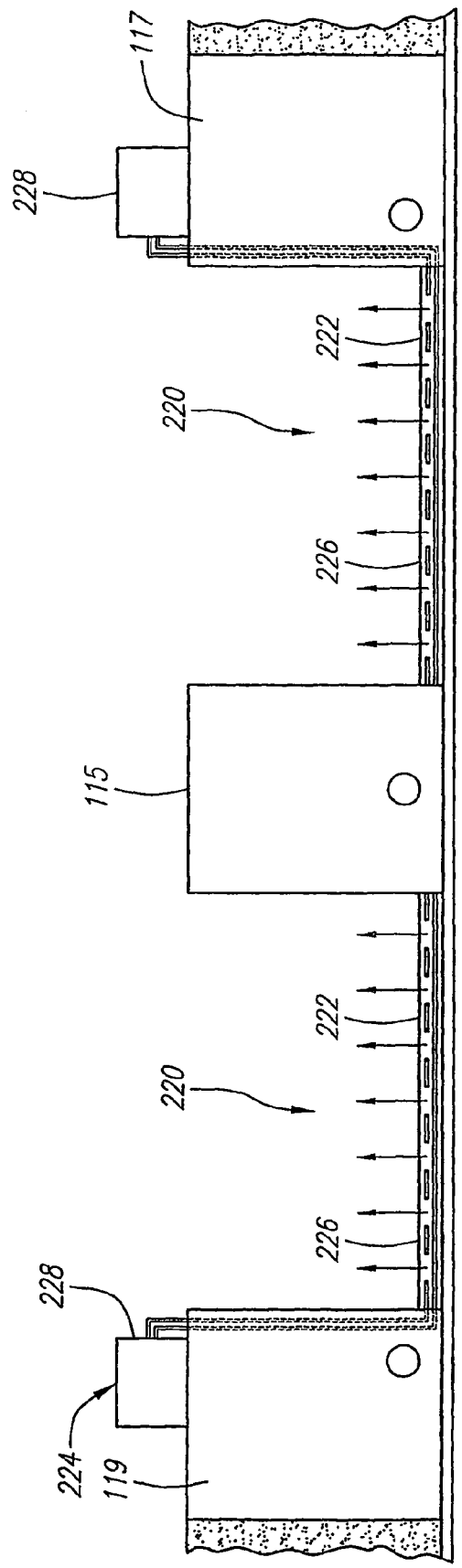
FIG. 9 is a cross-sectional view of the fine air bubbler header taken along the line 9-9 of FIG. 8 and showing one of a plurality of perforated steel pipes, and the pair of air compressor stations.

The overflow sump 202 includes a plurality of drain portals 208 which cooperate with a corresponding number of drain culverts 210 for delivering the first volume of recovered fresh water (indicated by arrow 185) to a retention reservoir discharge culvert 212 as is shown in FIGS. 2, 4A, 4B, 5 and 10. The discharge culvert 212 is an underground culvert and extends from beneath the overflow sump 202 of the retention reservoir 166 (see FIG. 5) to the saltwater intrusion barrier subsystem 162 located just outside of the lower lock doors 132 and 138 in the interface region 102 as shown in FIGS. 1, 2, 8 and 10. The retention reservoir discharge culvert 212 can have a diameter as large as 36'0" and be comprised of stainless steel. The discharge culvert 212 terminates in the interface region 102 with a plurality of vertically positioned, submerged return discharge ports 216 as is best shown in FIG. 8. The first volume of recovered fresh water (indicated by arrow 185) is gravity forced through the retention reservoir discharge culvert 212 at sea level and is delivered to the vertically positioned, submerged return discharge ports 216. The submerged return discharge ports 216 can be 18'0" in diameter and are positioned to vertically eject the first volume of recovered fresh water (indicated by arrow 185) for providing a hydraulic mounding zone 218 within the interface region 102.

Figure 11:
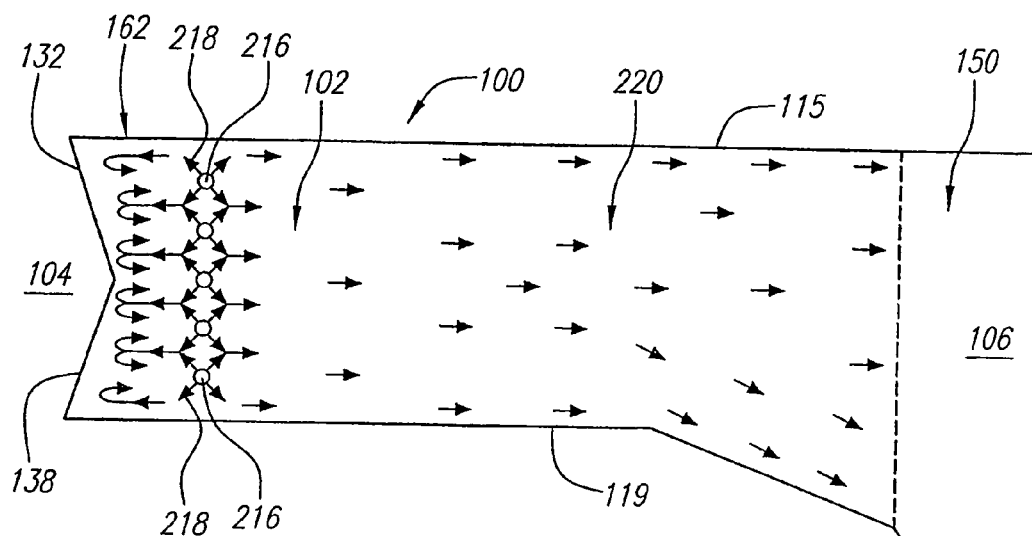
FIG. 11 is a plan view of the plurality of submerged return discharge ports extending from the retention reservoir discharge culvert for providing the hydraulic mounding zone within the saltwater intrusion barrier subsystem.
Figure 12:
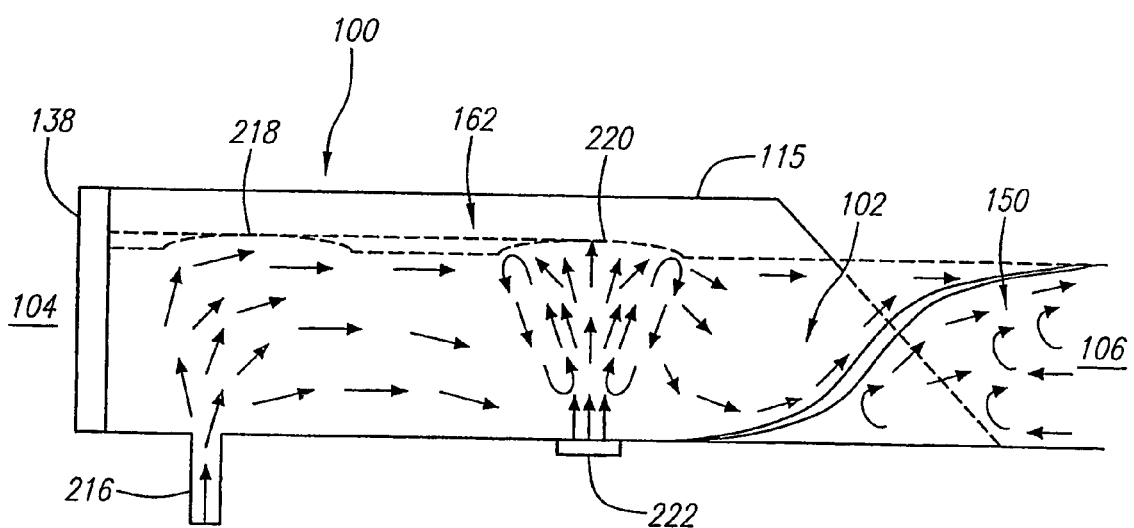
FIG. 12 is a cross-sectional view of the saltwater intrusion barrier subsystem taken along the line 12-12 of FIG. 8 showing one of the submerged return discharge ports of the retention reservoir discharge culvert for providing the hydraulic mounding zone, and showing the fine air bubbler header for providing the hydraulic mixing zone.

The function of the saltwater intrusion barrier subsystem 162 is to prevent the saltwater from the saltwater body 106 from intruding into the fresh water of the fresh water body 104. Prevention of the saltwater Intrusion process can be accomplished by increasing the density (or weight) of the fresh water with respect to that of the saltwater at the interface region 102 between the fresh water body 104 and the saltwater body 106. The increase in the density of the fresh water can be created to prevent saltwater intrusion by providing the hydraulic mounding zone 218 and a compressed air mixing zone 220 as shown in FIGS. 11 and 12. In providing the hydraulic mounding zone 218, large amounts of the first volume of recovered fresh water (indicated by arrow 185) are introduced vertically upward via the submerged return discharge ports 216 as shown in FIG. 8. The fresh water is vertically ejected in close proximity to the interface region 102 of the fresh water body 104 and the saltwater body 106 at the mouth of the lower lock doors 132 and 138 also shown in FIG. 8. Because of flow friction, the water in the interface region 102 will mound, i.e., rise above the surrounding water level, which increases the pressure within the mounding zone 218. Increasing the pressure within the mounding zone 218 also Increases the local density (or weight) of the first volume of recovered fresh water (indicated by arrow 185). This increase in the pressure of the first volume of recovered fresh water (indicated by arrow 185) offsets that of the saltwater and thus prevents saltwater intrusion.

The hydraulic mounding zone 218 created by the first volume of recovered fresh water 185 being vertically ejected through the submerged return discharge ports 216 causes the fresh water in the interface region 102 to be at a higher level than the surrounding saltwater, i.e., to mound. In particular, the water in the hydraulic mounding zone 218 is 0.3" higher than the saltwater in the saltwater channel 150.

This additional 0.3" of water height in the hydraulic mounding zone 218 equates to a higher pressure of the mounded water by virtue of the additional height over that of the surrounding saltwater. This pressure gradient of the mounded water in the hydraulic mounding zone 218 is equal to or greater than the weight (or density) of the surrounding fresh water in the interface region 102 and saltwater in the saltwater channel 150. Consequently, an influx of saltwater past the hydraulic mounding zone 218 into the fresh water body 104 is prevented. The increase in the height of the fresh water resulting from the implementation of the submerged return discharge ports 216 concurrent with the recovering and recycling of the fresh water from the canal lock system 110 sufficiently increases the pressure of the first volume of recovered fresh water 185 such that it exceeds the density pressure of the surrounding saltwater in the saltwater channel 150. Thus, the increased height of the fresh water associated with the hydraulic mounding zone 218 creates a barrier to the intrusion of saltwater through the lower lock doors 132 and 138 of the canal lock system 110 and subsequently into the fresh water body 104.

The second component of the saltwater intrusion barrier subsystem 162 is the creation of the compressed air mixing zone 220 shown best in FIGS. 8 and 12. This component of the saltwater intrusion barrier subsystem 162 includes a fine air bubbler header 222 and an air compression facility 224. The fine air bubbler header 222 is constructed of four 8" perforated pipes 226 that span the bottom width of the interface region 102 just beyond the lower lock doors 132 and 138 of the parallel locks 112 and 114, respectively, as shown in FIG. 8. The perforated pipes 226 of the fine air bubbler header 222 can be comprised of metal coated with, for example, epoxy to resist corrosion by the saltwater. In the alternative, the perforated pipes 226 can be comprised of Fiber Reinforced Piping (FRP) components that are robust and also resist corrosion.

The air compression facility 224 is comprised of a pair of air compressors 228 that pump compressed air through the fine air bubbler header 222. The compressed air pumped into the bubbler header 222 escapes through the perforated pipes 226 to agitate the fresh water and create a substantial curtain of air bubbles. The curtain of air bubbles rise to the surface causing the surface water level to bubble forming the mixing (bubbling) zone 220 and rise in displacement which increases the local water pressure in the mixing (bubbling) zone 220. Increasing the local water pressure also increases the local density (or weight) of the first volume of recovered fresh water 185. The increase in the pressure of the fresh water offsets the pressure of the surrounding saltwater and prevents intrusion of the saltwater into the fresh water body 104. Further, as the curtain of air bubbles rise to the water surface, a mixing current in the mixing (bubbling) zone 220 is created that equalizes the water density along the interface region 102 between the fresh water body 104 and the saltwater body 106 as a function of depth in both the fresh water body 104 and the saltwater body 106.

It is noted that the saltwater intrusion barrier subsystem 162 can function adequately to prevent saltwater intrusion if it includes either the submerged return discharge ports 216 for providing the hydraulic mounding zone 218, or the fine air bubbler header 222 for providing the mixing zone 220. However, maximum efficiency of the saltwater intrusion barrier subsystem 162 is obtained when the submerged return discharge ports 216 are used in conjunction with the fine air bubbler header 222 for providing the hydraulic mounding zone 218 and the compressed air mixing zone 220, respectively. Under these conditions, the vertically ejected fresh water from the submerged return discharge ports 216 is mixed with the curtain of air bubbles from the fine air bubbler header 222. This mixing process occurs throughout the entire vertical wall of fresh water located in the Interface region 102 just outside the lower lock doors 132 and 138. This mixing process results in an equalized pressure (density) throughout the entire vertical wall of fresh water which is greater than or equal to the pressure (density) of the saltwater in the saltwater body 106. This is the case since (a) the fresh water is higher than the saltwater due to the hydraulic mounding zone 218 and the compressed air mixing zone 220, and (b) the saltwater does not have an equalized pressure (density) since compressed air is not mixed with the saltwater.

Thus, the fresh water retention reservoir 166 operates in conjunction with the saltwater intrusion barrier subsystem 162 in that the retention reservoir 166 serves as a mechanical separator between the fresh water carried by the lock water recovery subsystem 160 and the saltwater of saltwater channel 150. The retention reservoir 166 receives all the fresh water discharged from the canal lock system 110 and delivers a controlled portion of the fresh water, i.e., the first volume of recovered fresh water (indicated by arrow 185), to the Weir gate valves 200 and the retention reservoir discharge culvert 212. The controlled portion of the recovered fresh water 185 is then gravity fed through the discharge culvert 212 to the region just outside of the lower lock doors 132 and 138 as shown in FIG. 8. The controlled portion of recovered fresh water 185 is then vertically ejected through the submerged return discharge ports 216 to provide the hydraulic mounding zone 218. The effect of the hydraulic mounding zone 218 is then combined with that of the compressed air mixing zone 220 to provide the wall of fresh water having an equalized pressure for preventing the intrusion of saltwater into the fresh water body 104 as described immediately above.

The particulars of the saltwater intrusion barrier subsystem 162 having been disclosed herein above, we will now return to complete the description of the fresh water retention reservoir 166. The first screen component 192 and the second screen component 194 of the V-shaped debris screen 190 are clearly shown in FIG. 5. The recovered fresh water carried by the lock water recovery culvert 168 enters the riser culverts 186 and exits the plurality of flow portals 188 within the debris screen 190. The first volume of recovered fresh water (indicated by arrow 185) passes through the first screen component 192 and is directed to the Weir gate valves 200 and overflow sump 202 as previously described. The remainder of the recovered fresh water (which includes the second volume of recovered fresh water indicated by the arrow 187, and the third volume of recovered fresh water indicated by the arrow 189) passes through the second screen component 194 of the debris screen 190 and into the retention reservoir 166. The remainder of the recovered fresh water 187, 189, once filtered through the debris screen 190, is subjected to a chemical pre-treatment within the retention reservoir 166 to satisfy a first-stage treatment standard in the following manner.

Positioned on the bottom of the concrete retention reservoir 166 is a course air bubbler header 232 and a chemical reagent injector 234 as is clearly shown in FIG. 2. The course air bubbler header 232 is similar to the fine air bubbler header 222 associated with the saltwater intrusion barrier subsystem 162 and is comprised of at least one perforated pipe. The perforated pipe of the course air bubbler header 232 can be comprised of metal with an epoxy coating or of Fiber Reinforced Piping (FRP), each of which resists corrosion due to the saltwater. Connected to the course air bubbler header 232 is an air compressor station 236 utilized to supply the course air bubbler header 232 with compressed air. The course air bubbler header 232 serves to oxygenate the recovered fresh water (indicated by arrows 187, 189). Connected to the chemical reagent injector 234 is a chemical reagent pump house 238 which serves to pump the chemical reagent to the reagent injector 234 and into the recovered fresh water as shown in FIG. 2. The chemical reagents or flocculates are added to the remainder of the recovered fresh water (indicated by arrows 187, 189) for causing the sedimentation and/or flotation of suspended solids, i.e. mineral type and organic type. This process rids the recovered fresh water of the suspended solvents and solid materials to provide clear water.

Further, the air bubbles released into the recovered fresh water by the course air bubbler header 232 assists in mixing the flocculate to enable it to attach onto the suspended solvents and suspended materials such as oil and grease.

The sedimentation of suspended solids within the recovered fresh water (indicated by arrows 187, 189) forms clumps that sink to the bottom of the retention reservoir 166 and are removed by an auger conveyor system (not shown). The auger conveyor system typically includes a continuously turning, electrically operated, screw-type sludge removal device that disposes of the sludge in one of a plurality of bottom drains or ports (not shown) formed in the bottom of the retention reservoir 166 for disposal into a main holding tank (not shown). The auger conveyor system (not shown) would typically be used in a water treatment facility. The flotation of suspended solids caused by the chemical reagents or flocculates produces a foam that floats and is skimmed off of the top of the recovered fresh water (indicated by arrows 187, 189) by a flow baffle 240 as shown in FIGS. 2, 4A and 4B. The flow baffle 240 is typically used in a water treatment facility for isolating and removing the foam or froth generated by the air bubbles created by the course air bubbler header 232 to prevent pollution of the chemically treated water. The flow baffle 240 can also be utilized to force the solids that sink in the recovered fresh water (indicated by arrows 187, 189) to flow through the bottom drains or ports (not shown) of the retention reservoir 166 for disposal into the main holding tank (not shown).

The recovered fresh water (indicated by arrows 187, 189) located downstream of the flow baffle 240 in the retention reservoir 166 as shown in FIG. 2 is now clear oxygenated water ready for distribution to two destinations. The second volume of recovered fresh water 187 is pumped via a first pump house 242 back to the fresh water body 104 to replenish the fresh water supply. The second volume of recovered fresh water 187 will be utilized for operations of the canal lock system 110, commercial and public utility requirements, agriculture and irrigation requirements, and the like. The third volume of recovered fresh water 189 is pumped via a second pump house 244 to the potable water treatment facility 164 shown in FIG. 2 for further processing to provide fresh potable water.

The potable water treatment facility 164 receives the clear oxygenated fresh water (i.e., third volume of recovered fresh water indicated by arrow 189) from the retention reservoir 166 best shown in FIG. 2. An aeration basin 250 is an open tank which is provided to aerate the recovered fresh water 189 prior to water treatment. The recovered fresh water 189 must be aerated to remove volatile and organic materials such as alcohols through evaporation. A plurality of fountains 252 located within the aeration basin 250 create water jets for the purpose of drawing oxygen into the recovered fresh water 189. Further oxygenating of the recovered fresh water 189 is required to promote bacteria activity for breaking down compounds within the recovered fresh water (indicated by arrow 189). A chemical reagent facility 254 injects chemicals such as soda ash, polymers and other suitable chemicals into the aerated fresh water from the aeration basin 250 for the purpose of purifying the water and to further enhance the suspension of solids. A plurality of mixers 256 function to thrash all of the chemicals and the aerated fresh water together to achieve a thorough mix.

The thoroughly chemically mixed, recovered fresh water 189 is then delivered to a plurality of sedimentation chambers 258 which are employed to enable the solids present in the recovered fresh water 189 to settle to the bottom of the chambers 258. The solids that settle to the bottom of the sedimentation chambers 258 are periodically removed through a vacuum suction process (not shown) similar to that utilized in cleaning a swimming pool. The recovered fresh water 189 is then delivered to a settling sedimentation basin 260 which represents a final sedimentation process step with a longer holding time to maximize the settling of solids. The next stage includes a media filtration stage 262 utilized to filter the chemically treated water. The media filtration stage 262 comprises anthracite/coal, sand, gravel and activated carbon which the recovered fresh water 189 progressively encounters. Next, a pair of 6'0" diameter pipe lines 264 pass the filtered fresh water 189 to a clear well 266 which is the holding tank for the recovered fresh water 189 which is now clear filtered potable water. Chlorine is then added to the filtered potable water in the clear well 266 to achieve sterilization. A pump house 268 then draws the filtered potable water from the clear well 266 and pumps it to a potable water storage facility (not shown) for use use in drinking, cooking, bathing and the like. An outdoor electrical substation 270 and an indoor electrical switchgear facility 272 are located adjacent to the saltwater intrusion prevention system 100 for providing the electrical power thereto.

In summary, the most fundamental embodiment of the saltwater intrusion prevention system 100 typically employed at the interface region 102 between the fresh water body 104 and the saltwater body 106 includes a water recovery subsystem 160 for recovering fresh water from the fresh water body 104. The retention reservoir 166 in fluid communication with the water recovery subsystem 160 receives and redirects the recovered fresh water. The saltwater intrusion barrier subsystem 162 in fluid communication with the retention reservoir 166 is positioned at the interface region 102 of the fresh water body 104 and the saltwater body 106. The saltwater intrusion barrier subsystem 162 includes a plurality of submerged return discharge ports 216 for vertically ejecting the recovered fresh water for providing a hydraulic mounding zone 218, and a fine air bubbler header 222 for creating a mixing zone 220. The hydraulic mounding zone 218 and the mixing zone 220 increase the density of the fresh water for offsetting saltwater from the saltwater body 106.

The present invention provides novel advantages over other saltwater systems known in the prior art. A main advantage of the saltwater intrusion prevention system 100 is that it conserves, recovers and recycles fresh water desperately needed for (a) use in the saltwater intrusion barrier subsystem 162 for preventing the intrusion of saltwater into the fresh water body 104 with a first volume of recovered fresh water 185, (b) use in the operation of the canal lock system 110 by returning a second volume of recovered fresh water 187 to the fresh water body 104, and (c) use in the potable water treatment facility 164 for providing fresh potable water for public, private and commercial use. Further, the saltwater intrusion barrier subsystem 162 employs the submerged return discharge ports 216 and the fine air bubbler header 222 for providing the hydraulic mounding zone 218 and the compressed air mixing (bubbling) zone 220, respectively, for preventing the intrusion of the saltwater into the fresh water body 104.

While the present invention is described herein with reference to illustrative embodiments for particular applications, it should be understood that the invention is not limited thereto. Those having ordinary skill in the art and access to the teachings provided herein will recognize additional modifications, applications and embodiments within the scope thereof and additional fields in which the present invention would be of significant utility.

It is therefore intended by the appended claims to cover any and all such modifications, applications and embodiments within the scope of the present invention.

Accordingly,

What is claimed is:

1. A saltwater intrusion prevention system for use at an interface between a fresh water body and a saltwater body comprising:
    a water recovery subsystem for recovering fresh water from a fresh water body;
    a retention reservoir in fluid communication with said water recovery subsystem for receiving and redirecting said recovered fresh water; and
    a saltwater intrusion barrier subsystem in fluid communication with said retention reservoir and positioned at an interface of said fresh water body and a saltwater body, said saltwater intrusion barrier subsystem including a plurality of submerged return discharge ports for introducing recovered fresh water from the retention reservoir and preventing the intrusion of saltwater from said saltwater body into said fresh water body.

2. The saltwater intrusion prevention system of claim 1 wherein said water recovery subsystem comprises a water recovery culvert and a valve for collecting said fresh water from said fresh water body and delivering said fresh water to said retention reservoir.

3. The saltwater intrusion prevention system of claim 1 wherein said retention reservoir comprises a debris screen for filtering out debris present in said recovered fresh water.

4. The saltwater intrusion prevention system of claim 1 wherein said retention reservoir further includes a plurality of weir gate valves for preventing the back flow of said saltwater into said retention reservoir.

5. The saltwater intrusion prevention system of claim 1 wherein said retention reservoir further includes a weir gate controller for controlling the flow of said fresh water to a plurality of weir gate valves.

6. The saltwater intrusion prevention system of claim 1 wherein said retention reservoir further includes an overflow sump for collecting said fresh water passing through a plurality of weir gate valves.

7. The saltwater intrusion prevention system of claim 6 wherein said overflow sump further includes a level control for controlling the volume of fresh water within said overflow sump.

8. The saltwater intrusion prevention system of claim 1 further including a retention reservoir discharge culvert for directing said fresh water to said saltwater intrusion barrier subsystem.

9. A saltwater intrusion prevention system for use at an interface between a fresh water body and a saltwater body comprising:
    a water recovery subsystem for recovering fresh water from a fresh water body;
    a retention reservoir in fluid communication with said water recovery subsystem for receiving and redirecting said recovered fresh water; and
    a saltwater intrusion barrier subsystem in fluid communication with said retention reservoir and positioned at an interface of said fresh water body and a saltwater body, said saltwater intrusion barrier subsystem including a plurality of submerged return discharge ports for ejecting said recovered fresh water, and a plurality of air bubbler headers for creating a mixing zone, said ejected recovered fresh water and said mixing zone for preventing the intrusion of saltwater from said saltwater body into said fresh water body.

10. The saltwater intrusion prevention system of claim 9 wherein said saltwater intrusion barrier subsystem further includes air compressor stations for providing compressed air to said air bubbler headers.

11. The saltwater intrusion prevention system of claim 9 wherein said air bubbler headers of said saltwater intrusion barrier subsystem is comprised of a plurality of submerged perforated pipes.

12. A method for preventing salt water intrusion at an interface between a fresh water body and a saltwater body comprising:

recovering fresh water from a fresh water body;

forming a hydraulic mounding zone that rises above the surrounding water level by ejecting said recovered fresh water from a plurality of submerged discharge ports at an interface between said fresh water body and a saltwater body thereby forming a curtain to prevent the intrusion of said saltwater into said fresh water body.

13. The method of claim 12 comprising receiving and redirecting said recovered fresh water after recovery and prior to ejecting.

14. The method of claim 13 comprising filtering debris from said recovered fresh water prior to ejecting.

* * * * *